July 19, 1932.  T. S. TERRY  1,868,402

HEDGE TRIMMER

Filed Oct. 26, 1929

INVENTOR.
THADDEAUS S. TERRY
BY Irving L. McCathran
ATTORNEYS.

Patented July 19, 1932

1,868,402

UNITED STATES PATENT OFFICE

THADDEAUS S. TERRY, OF McEWEN, TENNESSEE, ASSIGNOR OF ONE-HALF TO EDDIE J. WORK, OF McEWEN, TENNESSEE

HEDGE TRIMMER

Application filed October 26, 1929. Serial No. 402,709.

This invention apertains to hand tools for trimming hedges and has for one of its primary objects to provide a hedge trimmer embodying a pair of reciprocatory blades with handles carried by the blades for permitting the effective holding of the device and the operation of the blades relative to one another to bring about the trimming of the hedge.

Another important object of my invention is the provision of a hedge trimmer embodying a combined supporting plate and blade, said combined supporting plate and blade having slidably mounted thereon a second blade, the blades carrying V-shaped cutting teeth for receiving the branches of the hedge to be cut, the blades being further provided with novel supporting and operating handles, whereby the tool can be readily moved over the hedge and the blades reciprocated relative to one another.

A still further object of my invention is to provide an improved hedge trimmer of the above character, which will be durable and efficient in use, and one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawing, in which drawing:—

Figure 1:
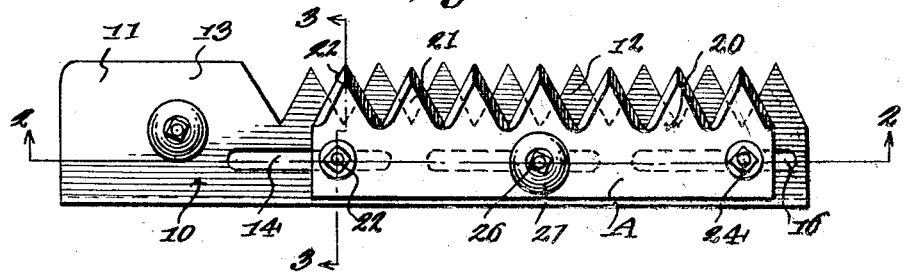
Figure 1 is a top plan view of the improved hedge trimmer.
Figure 2:
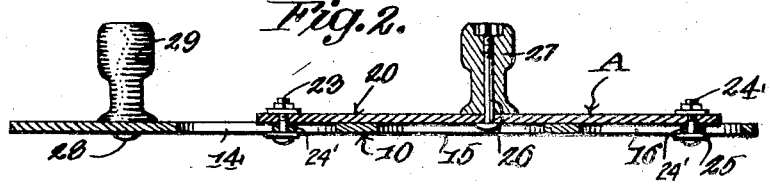
Figure 2 is a longitudinal section through the same taken on the line 2—2 of Figure 1 looking in the direction of the arrows.
Figure 3:
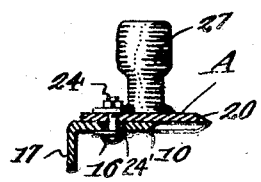
Figure 3 is a transverse section through the improved hedge trimmer taken on the line 3—3 of Figure 1 looking in the direction of the arrows.
Figure 4:
Figure 4 is a bottom plan view of my improved hedge trimmer.

Referring to the drawing in detail, wherein similar reference characters designate corresponding parts throughout the several views, the letter A generally indicates my improved hedge trimming device which comprises a combined bottom supporting plate and blade 10 and a top reciprocating blade 20.

The combined bottom supporting plate and blade 10 comprises an elongated flat metal body 11, preferably formed from steel. One longitudinal edge of the body 11 is provided with substantially V-shaped cutting teeth 12 which can be made integral with or separate from the plate 11. These teeth 12 extend from one transverse edge of the plate or body short of the opposite transverse edge and this end of the body 11 constitutes a handle or manipulating handle 13. This body 11 is provided with longitudinally extending spaced guide slots 14, 15, and 16 and these slots are all arranged in longitudinal alignment, for a purpose, which will be later described.

The longitudinal edge of the body 11 on opposite sides of the teeth 12 is bent either up or down at right angles to provide a reinforcing flange 17 as clearly shown in the drawing.

The top reciprocating knife blade 20 rests upon the upper surface of the bottom plate or blade 10 has one longitudinal edge thereof provided with V-shaped cutting teeth 21 which may be formed integral with the body of the blade or separate therefrom, as desired. These teeth 21 are formed similar to and are of the same size as the teeth 12 of the bottom plate or blade 10 and the edges of the teeth 12 are provided with oppositely beveled edges as indicated by the reference character 22. The teeth 21 extend from one end of the plate or blade 20 to the other and this plate supports depending guide bolts 23 and 24 which bolts extend through the guide slots 14 and 15. If desired, the bolts can be surrounded by suitable wear or bearing sleeves 24' for engaging the walls of the slots, and washers 25 are interposed between the heads of the bolts 23 and 24 and the lower surface of the body 11 of the bottom plate or blade 10.

The intermediate portion of the top blade 20 carries an upstanding handle bolt 26 which receives a manipulating handle 27. The head of the bolt 26 can be received in the slot 15 to facilitate the easy reciprocation of the blade 20 without binding on the blade or bottom plate 10.

Similarly the end 13 of the body portion 11 of the bottom plate or blade 10 supports a handle bolt 28 which receives the manipulating handle 29. In operation of my improved device, the handles 27 and 29 are grasped by the right and left hands of the operator respectively and the handles are alternately moved toward and away from one another so as to bring about the reciprocation of the blades and the moving of the V-shaped teeth 12 and 21 past one another.

It is obvious that branches of the hedge will be caught between the teeth and thus effectively severed. The arrangement of the reciprocating cutting bars with the plurality of cutting teeth permits a maximum amount of branches to be cut and thus a hedge can be quickly and easily trimmed in a minimum amount of time. Further the construction of the blades insures the proper trimming of the hedge in the proper planes.

It is to be understood that in trimming the sides of a hedge the trimmer is held in a vertical position so as to cause the projecting part of the long blade to extend above the upper end of the short blade. The operator may then lift the long blade to its highest position and the weight of the long blade will cause the teeth to effectively cut the hedge thereby relieving the operator of considerable exertion since the weight of the long blade will practically in all instances be sufficient to cause the blade to drop longitudinally upon the short blade thereby facilitating the cutting of the sides of the hedge with practically no exertion to the operator.

From the foregoing description, it can be seen that I have provided a novel hedge trimmer of exceptionally simple and durable character which embodies a minimum number of operating parts and which is entirely fool-proof.

Changes in details may be made without departing from the spirit or the scope of this invention, but

What I claim as new is:

A hedge trimmer comprising a pair of facing flat blades, one of said blades being formed longer than the other blade and extending beyond one end of said other blade whereby the weight of the long blade will facilitate the cutting of the sides of a hedge when the hedge trimmer is held in a vertical position so as to cause the extending portion of the long blade to project above the short blade, said long blade being provided with longitudinally extending guide slots, guide bolts carried by the relatively short blade and slidably received in said slots, coacting cutting teeth formed on the forward longitudinal edges of the blades, a manipulating hand knob secured directly to the extended end of the long blade, and a second hand knob secured directly to the other blade, said knobs extending in the same direction from the outer faces of the blades and at substantially right angles thereto.

In testimony whereof I affix my signature.

THADDEAUS S. TERRY.